United States Patent
Ledieu

(10) Patent No.: US 6,620,480 B1
(45) Date of Patent: Sep. 16, 2003

(54) PRE-ENGRAVED SUBSTRATE FOR MAGNETIC, MAGNETO-OPTICAL, OR PHASE TRANSITION OPTICAL DISC

(75) Inventor: Jean Ledieu, Crespieres (FR)

(73) Assignee: O.D.M.E. International B.V., Veldhoven (NL)

( * ) Notice: Subject to any disclaimer, the term of this patent is extended or adjusted under 35 U.S.C. 154(b) by 0 days.

(21) Appl. No.: 09/744,935

(22) PCT Filed: Aug. 5, 1998

(86) PCT No.: PCT/FR98/01745

§ 371 (c)(1),
(2), (4) Date: May 16, 2001

(87) PCT Pub. No.: WO00/08643

PCT Pub. Date: Feb. 17, 2000

(51) Int. Cl.$^7$ ................................................ G11B 5/66
(52) U.S. Cl. ............. 428/64.4; 428/65.3; 428/694 ML; 428/694 MT; 428/694 RL; 428/900; 427/128; 427/129; 427/130; 427/131; 427/132; 369/277; 369/278; 369/284; 369/285; 369/286
(58) Field of Search .................. 428/694 ML, 694 MT, 428/694 RL, 64.4, 65.3; 427/128–134, 164; 369/284, 277, 278, 285, 286

(56) References Cited

U.S. PATENT DOCUMENTS 5,186,995 A * 2/1993 Yoshizawa
5,518,788 A    5/1996 Invie .......................... 428/65.1
5,846,626 A * 12/1998 Kashiwagi et al. ......... 428/64.1

FOREIGN PATENT DOCUMENTS

| DE | 195 42 022 | 5/1996 |
| EP | 0 724 259 | 7/1996 |
| FR | 96 12636 | 4/1996 |

* cited by examiner

*Primary Examiner*—Leszek Kiliman
(74) *Attorney, Agent, or Firm*—Leydig, Voit & Mayer, Ltd.

(57) ABSTRACT

The invention concerns a pre-engraved substrate for a memory disc recordable by magnetic, magneto-optical or phase transition constraint, its manufacturing method and the resulting disc. Said pre-engraved substrate comprises a support (1) having at its surface a surface film (2) in a reflecting material and enabling to obtain a surface with optical polish and at least a recordable film (4), the surface film (2) and the film (4) comprising a succession of micro-grooves and/or pits (7) representing a pre-formatting signal, the walls (8) of said pits and/or microgrooves (7) being formed in such of films (2) and (4) of the material constituting said film. The invention is useful for making magnetic, magneto-optical and phase transition optical discs, used particularly in the field of computers.

15 Claims, 2 Drawing Sheets

US 6,620,480 B1

PRE-ENGRAVED SUBSTRATE FOR MAGNETIC, MAGNETO-OPTICAL, OR PHASE TRANSITION OPTICAL DISC

FIELD OF THE INVENTION

Background

The invention relates to a pre-engraved substrate for a memory disk recording information in response to a stress of a the magneto-optical or magnetic or phase-change type. This stress is applied to the first surface of the substrate, and not through it, as is the case in the traditional optical disks. Moreover, this stress will only be applied to the parts of the substrate between the pre-engraved zones, these parts being often called "lands" in the art. It relates also to a process for manufacturing this substrate as well as to the recordable memory disk which has this substrate or which is obtained by this process.

Currently, recordable memory disks or diskettes are widely used, for example, in computers as computer hard disks.

These disks or diskettes, in their most evolved versions, function in first surface recording mode and are magnetic disks with optical guiding assistance also called optically assisted magnetic disks, magneto-optical disks with optical guiding assistance, or phase-change optical disks.

They are generally composed of a medium that has a pre-formatting signal, and of a single- or multi-layer structure constituting the recordable memory and deposited on this medium, after engraving of pre-formatting in the medium.

The single- or multi-layer structure of the recordable memory has a layer in which the information items to be stored in memory are recorded.

In this type of memory, contrary to conventional optical disks, recording in the recordable layer is achieved by direct application, on the first surface, that is to say, without the passing through the medium, of the appropriate stress.

This stress can be applied by a magnetic field, thermal energy supplied by a light beam, or a combination of a magnetic field and thermal energy. In the disks of the magneto-optical and magnetic type, the recording of the information is done in the recordable layer by creation of zones in which the magnetic field is oriented differently (reversed) with respect to the magnetic field of the other zones, and in the phase-change optical disks, the recording is done by creation of zones in which the material constituting the recordable layer has undergone a phase transformation, that is to say has gone from an amorphous structure to a crystalline structure or from a crystalline structure to an amorphous structure.

SUMMARY OF THE INVENTION

Reading the information is then done by detection of the different magnetic fields or the differences in reflectivity due to the structural change of the material, respectively.

In all cases, the recordable layer consists of a hard material that is magnetic or capable of phase-change.

Disks of this type allow one to reach very high storage capacities, but their performances are still limited by alteration of the signal-to-noise ratio of the pre-format read signal, also called C/N ratio, generated by deposition of the layer or layers constituting the recordable memory, on the pre-format engraved at the beginning of the substrate manufacturing cycle.

The invention aims to alleviate this problem by proposing a recordable memory disk of the magneto-optical, magnetic or phase-change optical type having an improved signal-to-noise ratio of the pre-format read signal and whose manufacturing is simpler and more economical than the disks of this type currently manufactured.

To this effect, the invention proposes a pre-engraved substrate for a memory disk recordable by a stress of the magneto-optical or magnetic or phase-change optical type which has (a) a medium that has, on its surface, a layer made of a reflective material allowing one to obtain a surface with an optical polish, (b) on this layer of reflective material, a single- or multi-layer structure that has at least one layer recordable by application to the first surface of the substrate of a stress of the magnetic, magneto-optical or phase-change optical type, the layer being of reflective material, and the single- or multi-layer structure having a series of grooves and/or micro-pits representing a pre-formatting signal and extending from the surface of the outermost layer of the single- or multi-layer structure to a predetermined depth of the layer of reflective material that is less than the thickness of this layer of reflective material, and (c) optionally, a protective layer deposited on and entirely covering the last layer of the single- or multi-layer structure, the lateral walls of the grooves and/or micro-pits being formed, in each of the layers of the layer of reflective material and of the single- or multi-layer structure, only of the material constituting these layers, disregarding the aforementioned protective layer.

According to a first embodiment of the pre-engraved substrate of the invention, the medium and the layer of reflective material allowing one to obtain a surface with an optical polish are composed of different materials.

The medium can, for example, be made of glass or aluminum, and the layer of reflective material allowing one to obtain a surface with an optical polish can, for example, be made of nickel, brass, aluminum, chromium or titanium nitride.

According to a second embodiment of the pre-engraved substrate of the invention, the medium and the layer of reflective material are made of the same material.

In this case, the medium and the layer of reflective material are advantageously formed as a single piece.

An example of a material that can be used in this second embodiment is aluminum.

In all the embodiments of the invention, examples of materials constituting said at least one recordable layer are Ag—In—Sb—Te, Th—Fe—Co, Th—Fe—Cr, Th—Fe—Co—Cr, Tb—Ge—Sb, Th—Ge—In, Th—Ge—Ag, Fe—Cr, Fe—Co, or their alloys and mixtures.

The invention also relates to a process for manufacturing a pre-engraved substrate which includes:
(a) a step, performed first, of deposition of a single- or multi-layered structure that has at least one layer, recordable by application to the first surface of the substrate of a stress of the magnetic, magneto-optical or phase-change optical type, on the surface layer, made of reflective material that allows one to obtain an optical polish of a medium, (b) a step, performed second, of engraving a series of grooves and/or micro-pits representing a pre-formatting signal in the single- or multi-layered structure and in the surface layer of reflective material, the engraving extending from the outermost layer of the single- or multi-layered structure to a predetermined depth of the surface made of reflective material that is less than the thickness of this surface layer of reflective material, and (c) an optional step, performed last, of deposition of protective layer 11 on the surface of the last layer of the single- or multi-layered structure.

According to a preferred mode of implementing the process of the invention, the step of engraving the series of micro-pits and/or grooves representing the pre-formatting signal includes the steps of:

deposition of a photosensitive resin layer on the outermost layer of the single- or multi-layered structure;

recording of the pre-formatting signal in the form of a latent image in the photosensitive resin layer by scanning with a light beam or exposure through a mask;

elimination of the resin zones thus transformed;

transfer by appropriate engraving of the pre-formatting signal into the layers constituting the single- or multi-layered structure and the surface layer of reflective material of the medium down to a predetermined depth of the surface layer of reflective material that is less than the thickness of this surface layer of reflective material, and;

elimination of the residual resin.

In a first mode of implementation of the process of the invention, the medium consists of a different material from that of the surface layer of reflective material.

Thus, the medium can be made of glass or aluminum, and the surface layer can be made of nickel, brass, aluminum, chromium or titanium nitride.

In a second mode of implementing the process of the invention, the medium of [sic; and] the surface layer of reflective material are made of the same material.

Advantageously, the medium and the surface layer form a single piece.

An example of a material that can be used in these two cases is aluminum.

The invention also includes the magnetic, magneto-optical or phase-change optical disk that includes the pre-engraved substrate according to the invention or that is manufactured by the process of the invention.

The invention will be better understood and other characteristics, details and advantages of it will appear more clearly in the course of the following detailed description, with in reference to the appended figures, in which.

DETAILED DESCRIPTION

Figure 6:
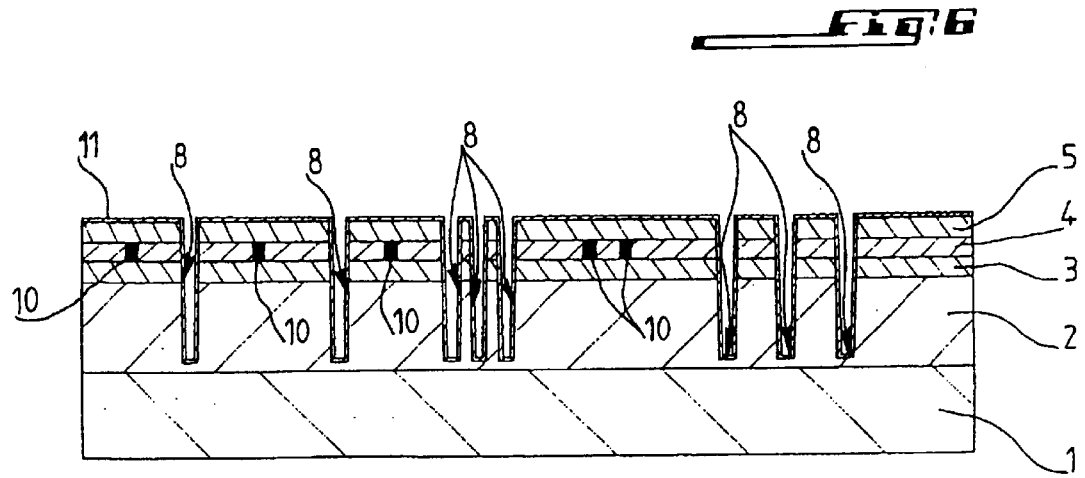

FIG. 6 represents an enlarged cross section of a recorded pre-engraved substrate according to the invention, with a protective layer.

BRIEF DESCRIPTION OF DRAWINGS FIGURES

The process for manufacturing a pre-engraved substrate according to the prior art, as well as the structure of the pre-engraved substrate according to the prior art, will be described first with reference to FIG. 1.

Figure 1:
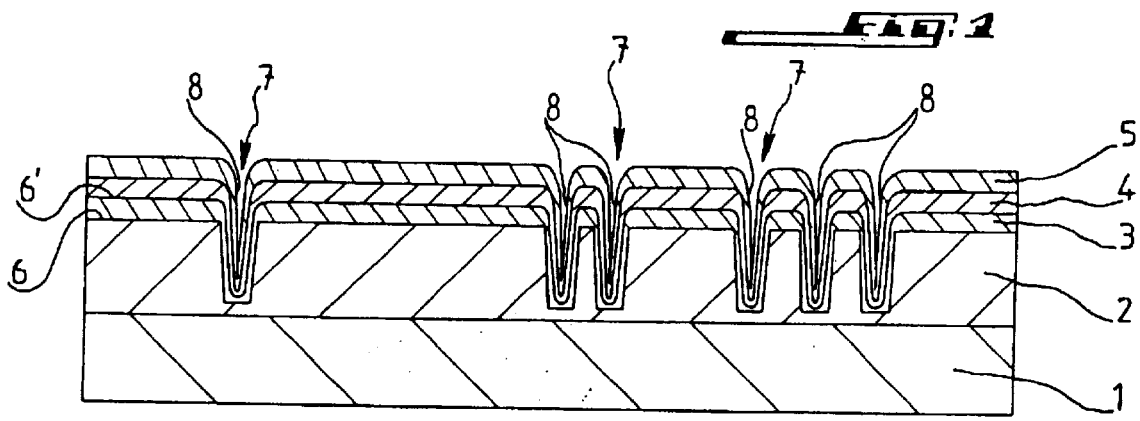
FIG. 1 is an enlarged cross section of a pre-engraved substrate according to the prior art.

The prior art process for manufacturing a pre-engraved substrate, as illustrated in FIG. 1, consists of engraving, by any appropriate means, the desired pre-formatting signal in the surface layer labeled 2 in FIG. 1 of medium labeled 1 in FIG. 1;

This pre-formatting signal makes it possible to ensure tracking, that is to say tracking, centering and guiding of the reading laser beam, and it can possibly contain address and clock information.

Thus, as represented in FIG. 1, surface layer 2 of medium 1 has a series of grooves and/or micro-pits or pits, labeled 7 in FIG. 1, representing the desired pre-formatting signal, and a series of flat zones or lands labeled 6 in FIG. 1.

Surface layer 2 is made of a reflective material allowing one to obtain a surface with an optical polish.

This means that if the medium consists of a material which is itself reflective and which can be polished to the appropriate surface condition (optical polish), there is no longer any reason for layer 2 to exist, and the pre-formatting is engraved in the medium itself.

Furthermore, if medium 1 is made of a material that is reflective but does not have the required surface condition, layer 2 will have the role of allowing one to obtain this surface condition but will also still have to fulfill the required reflectivity function. In the same way, if medium 1 has the required surface condition but is not reflective, layer 2 can be deposited, after engraving, on medium 1, in which case layer 2 will be as thin as possible.

In other words, in the prior art, depending on the reflectivity and surface condition attainable for medium 1, surface layer 2 will be present or absent and will be deposited before or after engraving.

In both cases, in the prior art process, the first manufacturing step consists of engraving the pre-format in medium 1, or in surface layer 2 of this medium 1 if the latter [layer] is present.

Then, the second step of the prior art process consists of depositing the single- or multi-layered structure which has at least one recordable layer labeled 4 in FIG. 1.

Thus, as illustrated in FIG. 1, first and optional barrier layer 3 is deposited on surface layer 2 of medium 1 containing the series of pits 7 and lands 6; then, layer 4, which is the actual recordable layer, is deposited on this barrier layer 3. A second and optional barrier layer 5 is then deposited on the free surface of layer 4.

A distinctive characteristic of the pre-engraved substrate of the prior art is that the external walls, labeled 8 in FIG. 1, of grooves and/or micro-pits 7 are made of the material constituting the layer last deposited of the single- or multi-layered structure, in this case the material constituting layer 5, by contrast to the pre-engraved substrate of the invention, as will be seen later.

Figure 2:
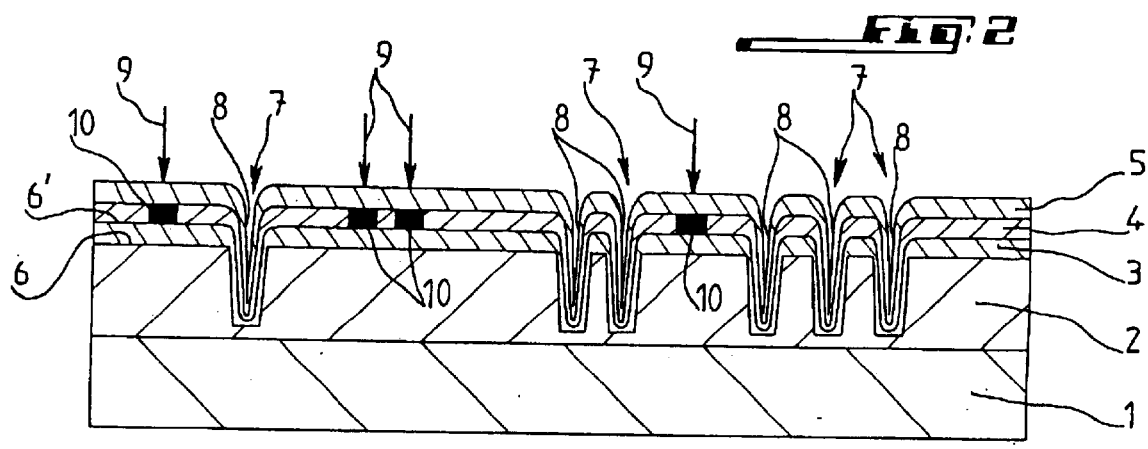
FIG. 2 represents an enlarged cross section of a pre-engraved and recorded substrate of the prior art, that is to say, a magnetic, magneto-optical or phase-change optical disk of the prior art.

As illustrated in FIG. 2, the information to be stored in memory is then recorded in recordable layer 4 by application of the appropriate stress through medium 1, and in the zones labeled 6' of recordable layer 4 in FIG. 2 and corresponding to lands 6 of medium 1.

This recording by application of the stress labeled 9 in the figures leads to the creation of zones 10 with different magnetic orientation from the other zones of recordable layer 4 or to the creation of zones 10 with a different "crystalline" structure from the other zones of recordable layer 4.

It should be noted here that recording of the information in recordable layer 4 is not done through the substrate, that is to say, it is a first surface recording.

Because of the successive depositions of these different layers, 3, 4 and 5, distortion of the pre-formatting signal occurs, which is detrimental to the signal-to-noise ratio.

Figure 3:
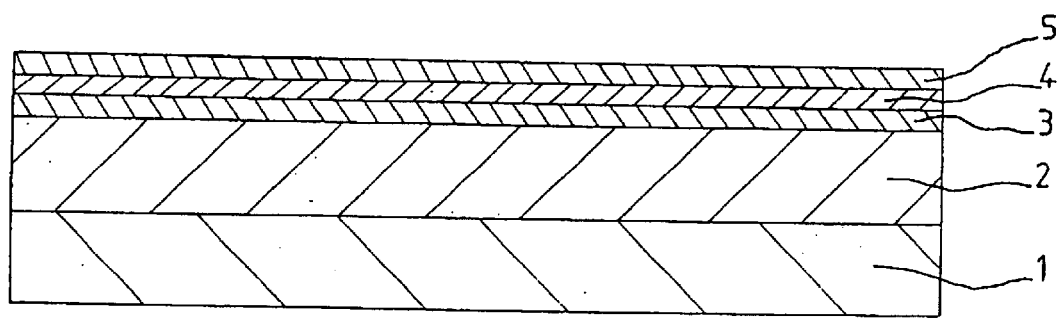
FIG. 3 is an enlarged cross section of a non-engraved, non-recorded substrate according to the invention.
Figure 4:
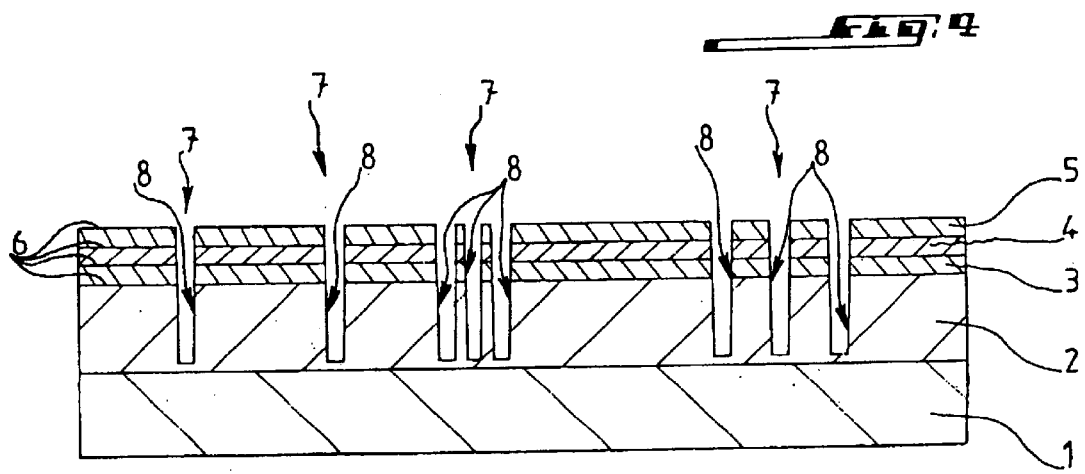
FIG. 4 represents an enlarged cross section of a pre-engraved substrate according to the invention.

In contrast to this prior art process for manufacturing a pre-engraved substrate, the process for manufacturing a pre-engraved substrate according to the invention consists, as illustrated in FIGS. 3 and 4, of depositing, first and in a first step, the different layers 3, 4 and 5 defined above on surface layer 2 made of reflective material that allows one to obtain an optical surface polish, and then, only after this deposition, of engraving the series of micro-pits and/or grooves 7 representing the desired pre-formatting signal.

Thus, the difference with respect to the process for manufacturing a pre-engraved substrate according to the invention appears here: the different layers constituting the pre-engraved substrate are deposited, before engraving, on surface layer 2 of medium 1.

Figure 5:
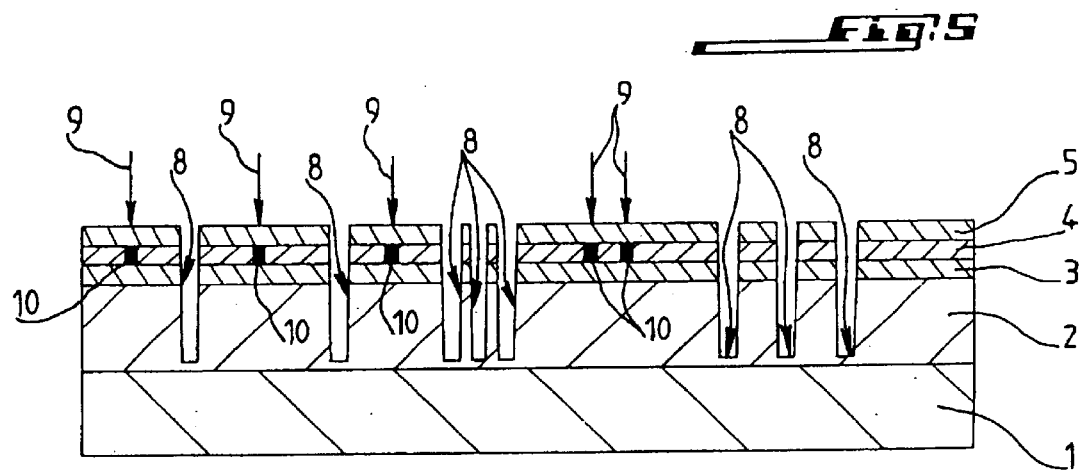
FIG. 5 represents an enlarged cross section of a recorded pre-engraved substrate according to the invention, that is to say a memory disk recordable by a stress of the magnetic, magneto-optical or phase-change optical type according to the invention.

As shown in FIGS. 4 and 5, the structural difference between the pre-engraved substrate of the invention and that of the prior art is also apparent: [of] the walls labeled 8 of grooves and/or micro-pits 7, these walls, passing through layers 2, 3, 4 and 5, consist only of each of the materials constituting layers 2, 3, 4 and 5, in these layers 2, 3, 4, and 5, respectively.

Furthermore, as in the case of the pre-engraved substrate and the prior art process, surface layer 2 is only present if the reflectivity and/or the surface condition of medium 1 is/are not satisfactory. Therefore, in this case also, surface layer 2 has the role of giving medium 1 the reflectivity and desired surface condition.

Returning to the manufacturing process of the invention, and as shown in FIG. 4, the pre-formatting signal is engraved in layers 3, 4 and 5, and in surface layer 2 of medium 1, by formation of a series of pits 7, representing this pre-formatting signal, and of lands 6. As shown in FIG. 4, the depth of pits 7 is less than the thickness of layers 2, 3, 4 and 5. This means that pits 7 and lands 6 are formed only, and in a single operation, in layers 2, 3, 4 and 5.

Thus, engraving of the pre-format is not distorted by the later deposition of the layers constituting the single- or multi-layered structure, as in the prior art.

This direct engraving in these different layers provides a substantial advantage: the signal-to-noise ratio of reading the pre-format is improved substantially.

An additional advantage of this manufacturing process is its simplification with respect to the prior art process: with this process, the different successive layers 2, 3, 4 and 5 are deposited with better homogeneity, since each of them is deposited on flat surfaces.

In all cases, yet another advantage of the process for manufacturing the pre-engraved substrate of the invention, and of the pre-engraved substrate itself, is that they are more economical to implement and to manufacture, respectively. In effect, in the case in which surface layer 2 is a layer separate from medium 1, and if poor recording of the pre-formatting signal occurs, only layers 3, 4 and 5 and possibly 2 have to be eliminated, which means that it is possible to simply re-deposit a new series of layers as defined above on medium 1, and proceed with new engraving and/or new recording. The process is therefore more economical in case of incident, because manufacturing medium 1 represents the most expensive element in manufacturing a pre-engraved substrate.

Recording the information to be stored in memory is then done in the recordable layer, as illustrated in FIG. 5, that is to say on the first surface of the substrate and as in the prior art.

One then obtains the recordable memory disk, of the magnetic, magneto-optical or phase-change optical type, illustrated in FIG. 5, and consisting of (a) medium 1 having surface layer 2 made of reflective material that allows one to obtain the appropriate surface condition and (b) the series of layers 3, 4, 5, layers 3 and 5 being optional, in which pits 7 have been engraved in one and the same operation.

As in the prior art process, with the pre-engraved substrate of the invention, recording of the information to be stored in memory in recordable layer 4 is done in lands 6 of recordable layer 4.

Recordable layer 4 can consist of any appropriate material. Examples of appropriate materials are the compounds Ag—In—Sb—Te, Th—Fe—Co, Th—Fe—Cr, Tb—Fe—Co—Cr, Th—Ge—Sb, Tb—Ge—In, Th—Ge—Ag, Fe—Cr, Fe—Co, or their alloys and mixtures.

In a first embodiment, medium 1 will consist of a different material from surface layer 2.

It can, for example, be made of glass or aluminum, and surface layer 2 can, for example, be made of nickel, brass, aluminum, chromium or titanium nitride.

In a second embodiment, medium 1 will consist of the same material as surface layer 2, but surface layer 2 will have been deposited on medium, for example, by chemical coating or by spraying, in order to give medium 1 the desired surface condition.

Also, when medium 1 consists of the same material as surface layer 2 and when this material is reflective and allows one to obtain the desired surface condition, medium 1 and surface layer 2 form a single piece.

In all cases, the depth of the grooves and/or micro-pits in surface layer 2 (which is independent from or an integral part of medium 1) will be less than the thickness of this surface layer 2.

In the process of the invention and with the substrate of the invention, the actual engraving of the pre-format can be achieved by any appropriate means, but in particular by the following process:

On the non-engraved substrate as described above and represented in FIG. 3, a photosensitive resin layer is deposited on the last layer 5, farthest from medium 1.

Then, the pre-formatting signal is recorded, in the form of a latent image, in this photosensitive resin layer, either by scanning with a light beam modulated as a function of the pre-formatting signal, or preferably by exposure of the photosensitive resin through a mask. In particular, this mask can be a holographic mask.

Then, the exposed zones of photosensitive resin are eliminated by any appropriate means, leading to the creation of a series of grooves and/or micro-pits in the photosensitive resin layer.

Then, these grooves and/or micro-pits are transferred, for example, by chemical etching, into the underlying layers, down to reflective surface layer 2, if present, or medium 1, if surface layer 2 is an integral part of medium 1, but to a depth less than the thickness of surface layer 2 or medium 1.

Finally, the residual photosensitive resin is eliminated by any appropriate means.

It should be labeled also that the pre-engraved substrate of the invention, as well as its manufacturing process, are not applicable to the manufacture of traditional optical disks for the reason, among others, of the position of reflective layer 6, which makes the engraving of the pre-format invisible through medium 1 when it is transparent.

Of course, the invention is in no way limited to the embodiments described and illustrated, which were only given as examples.

Thus, whereas in the preceding description the substrate of the invention was described as having barrier layers 3 and 5, it is possible for it to have only recordable layer 4, or else for it to have other layers depending on requirements. An example of such an optional additional layer is a so-called protective layer for the substrate, as represented in FIG. 6 in which this protective layer is labeled 11, and which has the role of protecting the substrate from any exterior attack such as exposure to the atmosphere, scratching, etc. In this way, the lifetime of the substrate is prolonged. This layer 11 will be made out of any material that is neutral with regard to recordable layer 4 and the laser tracking.

This additional layer 11 will be deposited before the actual recording of the information to be stored in memory in recordable layer 4, and this step is part of the process for manufacturing the substrate of the invention.

The thickness of this layer 11 can also be such that layer 11 will adopt the shape of micro-pits and/or grooves 7, or such that layer 11 will completely fill these micro-pits and/or grooves 7; that is to say, that it will encapsulate the substrate.

Likewise, medium 1 can consist of any appropriate material provided that it allows one to obtain the necessary surface condition.

Also, recordable layer 4 can be composed of materials other than those mentioned in the preceding that allow one to obtain a recordable memory as defined in the invention.

That is to say that the invention includes all technical equivalents of the means described as well as their combinations if they are executed according to its intent.

What is claimed is:

1. A pre-engraved substrate for a memory disk in which information is recorded by application of a stress of the magneto-optical or magnetic or phase-change optical type, comprising:
   (a) a medium,
   (b) a surface layer disposed on the medium and composed of a reflective material for producing a surface with an optical polish,
   (c) a layer structure disposed on the surface layer and including at least one layer in which information is recordable by application to the surface of the substrate of a magnetic, magneto-optical, or phase-change optical stress, wherein
      the surface layer and the layer structure have a series of at least one of grooves and micro-pits representing a pre-formatting signal,
      the series of at least one of grooves and micro-pits are defined by respective lateral walls transverse to the surface layer and the layer structure that extend from a top surface of the layer structure, through the layer structure and into the surface layer to a depth only partially through the surface layer, and
      each of the surface layer and layers of the layer structure has a surface defining a part of the lateral walls of the series of at least one of grooves and micro-pits.

2. The pre-engraved substrate according to claim 1, wherein the medium and the surface layer are different materials.

3. The pre-engraved substrate according to claim 2, wherein the medium is of one of glass and aluminum, and the surface layer is of one of nickel, brass, aluminum, chromium, and titanium nitride.

4. The pre-engraved substrate according to claim 1, wherein the medium and the surface layer are the same material.

5. The pre-engraved substrate according to claim 4, wherein the medium and the surface layer form a single piece.

6. The pre-engraved substrate according to claim 4, wherein the material is aluminum.

7. The pre-engraved substrate according to claim 1, wherein the material constituting said layer in which information is recordable is chosen from the group consisting of Ag—In—Sb—Te, Tb—Fe—Co, Th—Fe—Cr, Th—Fe—Co—Cr, Th—Ge—Sb, Tb—Ge—In, Tb—Ge—Ag, Fe—Cr, Fe—Co, and their alloys and mixtures.

8. A process for manufacturing a pre-engraved substrate for a magnetic, magneto-optical, or phase-change optical disk including:
   depositing a layer structure, including at least one layer in which information is recordable by application of a magnetic, magneto-optical, or phase-change optical stress, on a surface layer of a reflective material that may be an optically polished, disposed on a medium,
   after depositing the layer structure, engraving a series of at least one of grooves and micro-pits representing a pre-formatting signal in the layer structure and the surface layer, the series of at least one of grooves and micro-pits extending through the layer structure and into the surface layer to a depth only partially through the surface layer, and
   after engraving the series of at least one of grooves and micro-pits, depositing a protective layer on the layer structure and on lateral walls of the series of at least one of grooves and micro-pits.

9. The process according to claim 8, wherein engraving the series of at least one of grooves and micro-pits includes:
   depositing a photosensitive resin layer of the layer structure;
   recording the pre-formatting signal as a latent image in the photosensitive resin layer by one of scanning with a light beam and exposure to light through a mask;
   removing zones of the resin layer exposed to light;
   engraving the pre-formatting signal in the layer structure and the surface layer; and
   removing remaining resin of the resin layer.

10. The process according to claim 8, wherein the medium is a material different from the surface layer.

11. The process according to claim 8, wherein the medium and the surface layer are made of the same material.

12. The process according to claim 11, wherein the medium and the surface layer form a single piece.

13. A magneto-optical, magnetic, or phase-change optical disk which includes a pre-engraved substrate according to claim 1.

14. A magneto-optical, magnetic, or phase-change optical disk produced according to the process of claim 8.

15. The pre-engraved substrate according to claim 1 including a protective layer on the top surface of the layer structure and covering the lateral walls of the series of at least one of grooves and micro-pits.

* * * * *